(12) United States Patent
Bickham et al.

(10) Patent No.: US 7,844,155 B2
(45) Date of Patent: Nov. 30, 2010

(54) OPTICAL FIBER CONTAINING ALKALI METAL OXIDE

(75) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US); Daniel Aloysius Nolan, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/082,858

(22) Filed: Apr. 15, 2008

(65) Prior Publication Data

US 2008/0279515 A1 Nov. 13, 2008

Related U.S. Application Data

(60) Provisional application No. 60/928,052, filed on May 7, 2007.

(51) Int. Cl.
*G02B 6/02* (2006.01)
(52) U.S. Cl. .................. 385/126; 385/141; 385/142; 385/144
(58) Field of Classification Search ................ 385/141, 385/142, 144, 126
See application file for complete search history.

(56) References Cited

U.S. PATENT DOCUMENTS

| | | | | |
|---|---|---|---|---|
| 4,629,485 A | | 12/1986 | Berkey | 65/3.11 |
| 4,852,968 A | * | 8/1989 | Reed | 385/127 |
| 5,146,534 A | | 9/1992 | Lines | 385/142 |
| 7,088,900 B1 | | 8/2006 | Mishra | 385/142 |
| 7,254,305 B2 | * | 8/2007 | Mishra | 385/127 |
| 7,283,714 B1 | * | 10/2007 | Gapontsev et al. | 385/126 |
| 7,526,166 B2 | * | 4/2009 | Bookbinder et al. | 385/125 |
| 2005/0063663 A1 | * | 3/2005 | Anderson et al. | 385/142 |
| 2005/0158006 A1 | * | 7/2005 | Koh et al. | 385/143 |
| 2006/0120678 A1 | * | 6/2006 | Manyam et al. | 385/125 |

(Continued)

FOREIGN PATENT DOCUMENTS

GB 2228585 * 8/1990

OTHER PUBLICATIONS

U.S. Appl. No. 11/800,161, filed May 4, 2007, "Microstructured Transmission Optical Fiber".

(Continued)

*Primary Examiner*—Charlie Peng
(74) *Attorney, Agent, or Firm*—Robert L. Carlson (57) ABSTRACT

Disclosed is an optical fiber having a silica-based core comprising an alkali metal oxide a silica-based core, said core comprising an alkali metal oxide selected from the group consisting of $K_2O$, $Na_2O$, $Li_2O$, $Rb_2O$, $Cs_2O$ and mixtures thereof in an average concentration in said core between about 10 and 10000 ppm by weight, and a silica-based cladding surrounding and directly adjacent the core, the cladding including a region having a lower index of refraction than the remainder of such cladding. By appropriately selecting the concentration of alkali metal oxide dopant in the core and the cladding, a low loss optical fiber may be obtained which exhibits a cable cutoff less than 1400 nm chromatic dispersion at 1550 nm between about 13 and 19 ps/nm/km, and a zero dispersion wavelength less than about 1324 nm.

20 Claims, 3 Drawing Sheets

U.S. PATENT DOCUMENTS

| | | |
|---|---|---|
| 2007/0098339 A1 | 5/2007 | Bringuier et al. ............ 385/106 |
| 2007/0104437 A1 | 5/2007 | Bookbinder et al. ........ 385/125 |
| 2007/0297735 A1* | 12/2007 | Khrapko et al. ............. 385/127 |
| 2008/0013905 A1 | 1/2008 | Bookbinder et al. ........ 385/124 |
| 2008/0056654 A1 | 3/2008 | Bickham et al. ............ 385/124 |
| 2008/0056658 A1 | 3/2008 | Bickham et al. ............ 385/127 |
| 2008/0131066 A1* | 6/2008 | Bickham et al. ............ 385/125 |

OTHER PUBLICATIONS

U.S. Appl. No. 12/004,174, filed Dec. 20, 2007, "Bend Resistant Multimode Optical Fiber".

* cited by examiner

"Enlarged View"

FIG. 4

OPTICAL FIBER CONTAINING ALKALI METAL OXIDE

CROSS-REFERENCE TO RELATED APPLICATIONS

This application claims the benefit of, and priority of U.S. Provisional Patent Application No. 60/928,052 filed on May 7, 2007, the content of which is relied upon and incorporated herein by reference in its entirety.

BACKGROUND OF THE INVENTION

1. Field of the Invention

The present invention relates generally to optical fibers doped with an alkali metal oxide and methods and apparatus for making same.

2. Technical Background

Attenuation is a principal limiting attribute of optical fibers. Optical fiber loss, for example, plays an important role in setting the limiting distance between optical fiber amplifiers. This is particularly important in long distance and ultra-long distance networks such as, for example, undersea applications, where such amplifiers represent a significant system cost, as well as a major factor in system reliability. Consequently there is tremendous commercial interest in developing optical fibers having reduced attenuation.

SUMMARY OF THE INVENTION

One broad aspect of the present invention relates an optical fiber comprising a silica-based core and cladding, wherein the core comprises an alkali metal oxide selected from the group consisting of $K_2O$, $Na_2O$, $Li_2O$, $Rb_2O$, $Cs_2O$ and mixtures thereof in an average concentration in said core between about 10 and 10000 ppm by weight. The cladding which surrounds the core preferably includes at least a first annular region having an index delta percent lower than that of the core, and a second annular region having an index delta percent lower than that of the first annular region. Preferably, the second annular region comprises randomly distributed voids, fluorine, or mixtures thereof. The terms holes and voids are used interchangeably herein. Preferably the second annular region is spaced from the core (by the first annular region) by a distance of at least 5 microns, most preferably at least 10 microns. Preferably the second annular region is surrounded by a third annular cladding region which has a refractive index delta higher than that of the second annular cladding region. Preferably the second annular region exhibits a refractive index delta which is at least 0.1 delta percent lower and more preferably at least 0.2 delta percent lower than the first annular region, and preferably lower than both the first and third annular regions. In some preferred embodiments, the concentration of alkali metal oxide in said core is between about 50 and 1000 ppm. In embodiments where the second annular region includes a plurality of randomly distributed voids, the voids preferably have a mean diameter less than about 2000 nm.

In some preferred embodiments the core consists essentially of no germanium, and more preferably is germanium free. In this way, by employing fluorine doping in the first annular region which preferably is immediately adjacent to the core, the core index will be positive compared to the adjacent region. Preferably, the second annular region can be formed by employing either randomly distributed voids, fluorine, or mixtures thereof. In preferred embodiments, the cladding comprises a third annular region comprising fluorine doped silica and a third annular region surrounds said second annular region. According to one aspect of the present invention an optical fiber comprises: a glass core extending from a centerline to a radius $R_1$; a glass cladding surrounding and in contact with the core, the cladding comprising: (i) a first annular region extending from $R_1$ to a radius $R_2$, the inner region comprising a radial width, $W_2=R_2-R_1$, (ii) a second annular region extending from $R_2$ to a radius $R_3$, the second annular region comprising a radial width, $W_3=R_3-R_2$, and (iii) a third annular region extending from $R_3$ to an outermost glass radius $R_4$. The core preferably comprises a maximum relative refractive index, $\Delta_{1MAX}$, relative to the third annular cladding region, $0.2\% < \Delta_{1MAX} < 0.6\%$. The first annular cladding region preferably comprises a refractive index delta $|\Delta_2(r)| < 0.05\%$. The second annular region preferably comprises a minimum relative refractive index, $\Delta_{3MIN}$, relative to the third annular region, wherein $\Delta_{3MIN} < -0.1$, more preferably $< -0.3\%$. In other words, in this embodiment, $\Delta_{1MAX} > \Delta_{2MAX} > \Delta_{3MIN}$, and $\Delta_{1MAX} > \Delta_{2MIN} > \Delta_{3MIN}$. The core and the cladding of this embodiment are capable of providing a fiber with cable cutoff less than 1500 nm, attenuation at 1550 nm less than 0.18 dB/km and effective area at 1550 nm greater than 72 $\mu m^2$, more preferably greater than 75 $\mu m^2$, even more preferably greater than 85 $\mu m^2$, and most preferably greater than 95 $\mu m^2$. The second annular region may comprise silica glass doped with fluorine or randomly distributed voids, or combination thereof.

Alternatively, the second annular region may comprise silica glass with a plurality of randomly distributed closed holes, the holes being either empty (vacuum) or gas filled, wherein the holes provide internal reflection of light, thereby providing wave guiding to light traveling along the core. The holes are preferably filled with a mixture of nitrogen and helium. Such holes can provide an effective refractive index which is low, e.g. compared to pure silica. The second annular region 20 has a profile volume, $V_3$, defined herein as:

$$2\int_{R2}^{R3} \Delta_3(r) r \, dr$$

Preferably, $\Delta_{1MAX} < 0.6\%$, $\Delta_{2MIN} > -0.05\%$, $\Delta_{2MAX} < 0.05\%$, $\Delta_{3MIN} < -0.1\%$, more preferably less than $-0.25\%$, and the absolute magnitude of the profile volume of the second annular region, $|V_3|$, is greater than 20%-$\mu m^2$. Even more preferably, $\Delta_{3MIN} < -0.45\%$, and in some cases it is possible for $\Delta_{3MIN} \leq -0.7\%$.

In some embodiments, 20%-$\mu m^2 < |V_3| < 80\%$-$\mu m^2$. In other embodiments, 30%-$\mu m^2 < |V_3| < 70\%$-$\mu m^2$. In other embodiments, 40%-$\mu m^2 < |V_3| < 60\%$-$\mu m^2$.

In some cases, preferably, $0.2\% < \Delta_{1MAX} < 0.6\%$, in other cases, preferably $0.20\% < \Delta_{1MAX} < 0.40\%$.

In some embodiments $W_3 > 1.0$ $\mu m$, and in other embodiments $1.0 < W_3 < 10.0$ $\mu m$, in some embodiments $W_3 < 8.0$ $\mu m$, and in other embodiments $2.0 < W_3 < 4.0$ $\mu m$.

The bending loss can be improved by choosing the volume of the second annular region, which is defined as the product of the cross sectional area of the second annular region and the absolute value of delta $V_{3min}$ in percent times square microns (%-$\mu m^2$). The volume of the second annular region affects actual fiber and cable cutoff wavelengths. To have a cable cutoff wavelength less than 1500 nm, it is preferable that $|V_3|$, the absolute value of the volume of the second annular region be less than 80%-$\mu m^2$.

Using the fiber designs disclosed herein, fibers are achievable which exhibit a cable cutoff less than 1300, more preferably less than 1260 nm, a chromatic dispersion at 1550 nm between about 13 and 19 ps/nm/km, more preferably between 14 and 18 ps/nm/km, a zero dispersion wavelength less than about 1420 nm, more preferably less than about 1350 nm, and most preferably less than about 1324 nm, and which preferably exhibits a dispersion slope less than about 0.092 ps/nm/km at 1310 nm, more preferably less than or equal to about 0.090 ps/nm/km at 1310 nm, and a dispersion slope less than about 0.07 ps/nm$^2$/km at 1550 nm.

The optical fibers disclosed herein are also capable of exhibiting an effective area greater than about 70 μm$^2$ at 1550 nm, more preferably greater than 75 μm$^2$, even more preferably greater than 85 μm$^2$, and most preferably greater than 95 μm$^2$ at 1550 nm, while also exhibiting an attenuation at 1550 nm which is less than 0.18 dB/km, more preferably less than 0.175 dB/km, and most preferably less than 0.17 dB/km. Such fibers also can exhibit a 15 mm bend loss of less than 5 dB/turn, a 20 mm bend induced loss of less than 1 dB/turn at 1550 nm, preferably less than 0.5 dB/turn, more preferably less than 0.1 dB/turn, and a 30 mm bend loss of less than 0.04 dB/turn.

The alkali metal oxide is preferably present in the core in an average concentration in said core between about 50 and 500 ppm by weight, more preferably between about 100 and 300 ppm by weight. The core of the optical fiber preferably contains substantially no germania, and more preferably contains no germania dopant. The core may include fluorine, and in some embodiments the average concentration of fluorine in said core is preferably greater than the average concentration of alkali metal oxide in said core. The core of the fiber as well as the cladding of the optical fiber may additionally include chlorine, and in some preferred embodiments the average concentration of chlorine in said core is preferably greater than the average concentration of alkali metal oxide in said core. By average concentration as used herein, we mean the average concentration over the entire core. Thus, for example, if the inner 50 percent of the core exhibits 300 ppm by weight $K_2O$, and the outer 50 percent of the core exhibits 400 ppm by weight $K_2O$, the average concentration of $K_2O$ in the core would be 350 ppm. $K_2O$ is the post preferred alkali metal oxide for doping in accordance with the invention.

The core of said fiber preferably comprises chlorine in an average concentration in said core greater than about 750 ppm by weight. The cladding is a silica-based cladding which surrounds and preferably is directly adjacent the core. The cladding preferably contains fluorine in an amount greater than 10000 ppm. The core preferably consists essentially of no germanium, and more preferably the core is germanium free.

In one preferred embodiment, the core of said fiber comprises a first region located along the centerline of the core which contains chlorine in an amount less than 100 ppm, and a second core region surrounding said first region, wherein said chlorine content is greater than 100 ppm. The first region also preferably comprises a maximum fluorine amount which is greater than the minimum fluorine content in said second region.

In embodiments in which germanium is not included as a dopant, the average concentration of chlorine in the core is preferably greater than 500, more preferably greater than 750 ppm, and even more preferably greater than 1000 ppm. The average concentration of fluorine in the core is preferably greater than 500, more preferably greater than 750 ppm, even more preferably greater than 1000 ppm, and most preferably greater than about 1500 ppm.

Using the fiber designs disclosed herein, optical fibers can be made which exhibit an attenuation less than about 0.30 dB/km at 1310 nm and less than about 0.18 dB/km at 1550 nm; preferably less than about 0.175 dB/km at 1550 nm, more preferably less than about 0.17 dB/km at 1550 nm. At the same time, the fibers disclosed herein are capable of exhibiting a 20 mm bend induced loss of less than 1 dB/turn at 1550 nm, preferably less than 0.5 dB/turn, more preferably less than 0.25 dB/turn.

Preferably, both the core and the cladding of the optical fiber contain an alkali metal oxide dopant. The optical fiber has at least one core segment; however, this is not critical and the optical fiber may alternatively comprise multiple core segments.

The core of the optical fiber preferably contains less than 20 ppb of OH.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention. Where appropriate, identical features have been identically numbered.

DETAILED DESCRIPTION OF THE INVENTION

The present invention relates to a low loss optical fiber and methods for making the same. More specifically, the invention relates to an optical fiber doped with an alkali metal oxide dopant and methods for manufacturing the optical fiber and associated preforms. The following terms as used herein have the following meanings:

The mode field diameter is a measure of optical power across the endface of a single-mode optical fiber, and is expressed as:

$$2\omega_0 = (\lambda/\pi)[2\int I(\Phi)\sin\Phi\cos\Phi d\Phi)/\int I(\Phi)\sin^3\Phi\cos\Phi d\Phi]^{1/2} \quad (1)$$

where $2\omega_0$ is the mode field diameter (and therefore $\omega_0$ is the mode field radius), $\lambda$ is the mean wavelength of the light, $\Phi$ is the angle with respect to the center of the radiation pattern, and the integrations are preferably carried out from 0 to 90°. Mode field diameter may be measured, for example, according to test procedure ANSI/TIA/EIA-455-191-A-2001.

Effective area is $$A_{eff} = 2\pi \left( \int_0^\infty E^2 r\,dr \right)^2 \bigg/ \left( \int_0^\infty E^4 r\,dr \right) \quad (2)$$

where the integration limits are 0 to ∞, and E is the electric field associated with the propagated light.

The cabled cutoff wavelength, or "cabled cutoff is even lower than the measured fiber cutoff due to higher levels of bending and mechanical pressure in the cable environment. Cabled cutoff measurement is performed using the 22 m test, which for example is described in EIA-455-170 Cable Cutoff Wavelength of Single-mode Fiber by Transmitted Power, or "FOTP-170". As used herein cable cutoff means the value obtained using the test described in the EIA-445 Fiber Optic Test Procedures.

The relative refractive index, A, is defined by the equation $\Delta_i = (n_i^2 - n_c^2)/2n_i^2$, where $n_i$ is the maximum refractive index of the index profile segment i, and $n_c$ is the refractive index of the outer cladding layer. The relative refractive index is generally expressed as a percent and is indicated herein for example as delta percent or % Δ.

Core refers to that portion of the optical fiber which has a generally raised index of refraction relative to the cladding, so that the transmitted optical power propagates predominately through the core. The core may be comprised of one or more segments. An individual core segment may have a refractive index greater than pure silica, equal to pure silica, or less than pure silica.

"ppm", unless otherwise specifically noted otherwise, refers to parts per million by weight.

Figure 1:
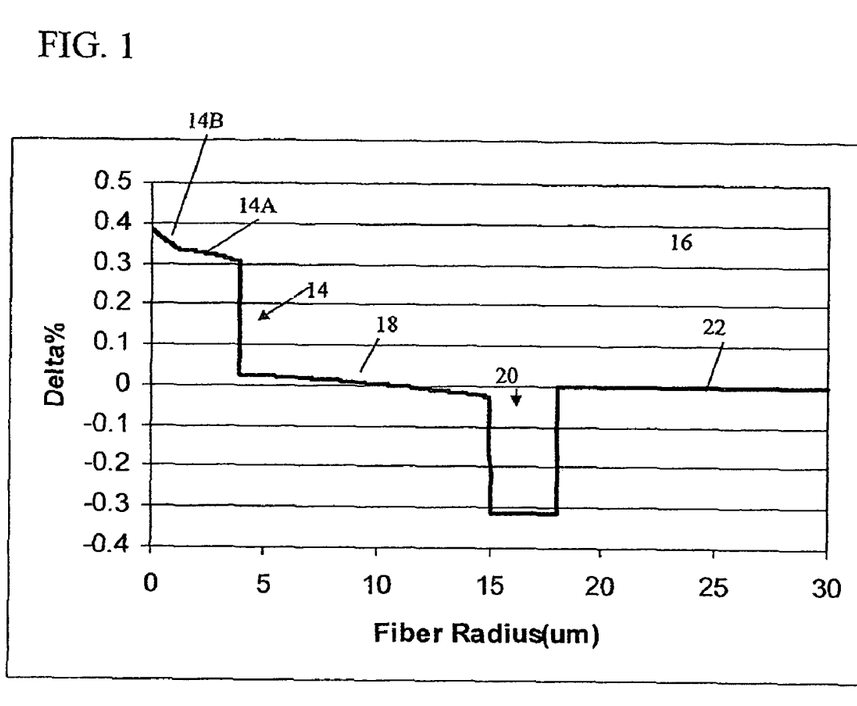
FIG. 1 is an illustration of a step index optical fiber refractive index profile in accordance with the invention.

As illustrated in FIG. 1, in preferred embodiments, the optical fiber disclosed herein preferably comprises a core and a cladding surrounding the core. Preferably, the cladding surrounds and is directly adjacent the core. Preferably, the core contains essentially no germania, more preferably the core contains no germania. In some preferred embodiments, the core consists of a single core segment, namely a central core segment 14, and a cladding 16 surrounding and directly adjacent the central core segment, as represented by FIG. 1 and variations of the illustrative profile of FIG. 1, such as profiles having a step, rounded, alpha or triangular shape, wherein the central core segment has a positive refractive index $\Delta_1(r)$ relative to the cladding. In other preferred embodiments, the core comprises multiple core segments, such as a central core segment and a first annular core segment surrounding and directly adjacent the central core segment, and a cladding surrounding and directly adjacent the first annular core segment, wherein the central core segment has a non-negative, preferably positive, relative refractive index $\Delta_1\%(r)$ relative to the cladding, and wherein the first annular core segment pure silica, has a non-negative, preferably positive, relative refractive index $\Delta_2\%(r)$ relative to the cladding.

In the embodiment illustrated in FIG. 1, the core segment 14 preferably extends to about 2 to 8, more preferably 3 to 6, and most preferably 3.5 to 4.5 microns from the center of the optical fiber, and the cladding portion 16 extends from the outer radius of the core to the outermost radius of the optical fiber. As illustrated in FIG. 1, the preferred embodiments employ at least a first core region 14A which comprises index of refraction $\Delta_1$ and a cladding region 16 comprising index of refraction delta which is lower than $\Delta_1$. The average refractive index over the entire core segment 14 preferably is between about 0.1% to 0.5% Δ, more preferably between about 0.3 and 0.4% Δ. Preferred values of $\Delta_1$ for region 14A are between about 0.25 and 0.45% Δ, more preferably between about 0.30 and 0.35% Δ. Region 14A may continue its slope across to the centerline of the fiber or, alternatively, core region 14 may optionally also include region 14B which includes $\Delta_0$ which is preferably larger than $\Delta_1$ if region 14B is employed. If core region 14B is employed along the centerline of the optical fiber, the preferred values for peak refractive index $\Delta_0$ for region 14B are between about 0.25 and 0.60% Δ, more preferably between about 0.36 and 0.46% Δ, and preferably region 14B if employed has a peak refractive index which is higher than that of core region 14A. Thus, in preferred embodiments, the core segment 14 comprises a higher refractive index along the centerline of the optical fiber than near the outermost portion of the core region 14.

The cladding 16 which surrounds the core preferably includes at least a first annular region 18 having an index delta percent $\Delta_2$ lower than that of the core 14, and a second annular region 20 having an index delta percent $\Delta_3$ lower than $\Delta_2$ of the first annular region 18. Preferably, the second annular region 20 comprises randomly distributed voids, fluorine, or mixtures thereof. Preferably the second annular region 20 is spaced from the core (e.g., by the width of first annular region 18) by a distance of at least 5 microns, most preferably at least 10 microns. Preferably, second annular region 20 is surrounded by outer cladding region 22 having delta $\Delta_4$, which in preferred embodiments is fluorine doped and preferably extends to the outermost periphery of the glass fiber.

In embodiments where the second annular region 20 includes a plurality of randomly distributed voids, the voids or holes are preferably non-periodically located in the annular region 20. By "non-periodically disposed" or "non-periodic distribution", we mean that when viewed in cross section (such as a cross section perpendicular to the longitudinal axis) of the optical fiber, the non-periodically disposed holes are randomly or non-periodically distributed across the hole containing region. Cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically located within the fiber structure. These holes are stretched (elongated) along the length (i.e. parallel to the longitudinal axis) of the optical fiber so that they are longer along the axial direction of the fiber than across the diameter of the fiber, but do not extend the entire length of the entire fiber for typical lengths of transmission fiber.

If non-periodically disposed holes or voids are employed in depressed annular region 20, it is desirable that they be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the annular hole containing region comprises greater than 10 holes when said fiber is viewed in cross-section, more preferably greater than 100 holes when said fiber is viewed in cross-section, even more preferably greater than 400 holes when said fiber is viewed in cross-section, and most preferably greater than 600 holes when said fiber is viewed in cross-section. In fact, the techniques disclosed herein are sufficient to result in greater than 1000, and even greater than 2000 holes in the annular ring of the fiber, even for annular rings which have a width of less than 10, and more preferably less than 7 microns. Thus, for example, one particularly preferred embodiment of optical fiber would exhibit greater than 10, more preferably greater than 100 holes in cross-section of the optical fiber, the holes having a maximum diameter less than 1550 nm and a mean diameter less than 775 nm. In some embodiments, the non-periodically disposed holes have a mean diameter of less than 500, preferably less than 300 and more preferably less than 200 nm and greater than 5 nm. In some other embodiments, the fibers disclosed herein have fewer than 1000 holes, and in other embodiments the total number of holes is greater than 10 and fewer than 500 holes in a given fiber perpendicular cross-section. For embodiments which employ randomly distributed voids therein, such embodiments preferably employ a void fill fraction which is preferably between about 1 to 10 percent, more preferably between 1.5 to 7.5 percent. Void fill fraction, as used herein, is the ratio of the combined total area of the voids in the void containing region divided by the area of the randomly distributed void containing region (e.g. region 20) when the fiber is viewed in cross section. Of course, in some embodiments, the fibers will exhibit combinations of these characteristics. Thus, for example, one particularly preferred embodiment of optical fiber would exhibit greater than 10, more preferably greater than 100 and fewer than 300 holes in cross-section of the optical fiber, the holes having a maximum diameter less than 1550 nm and a mean diameter less than 775 nm. In some embodiments, the non-periodically disposed holes have a mean diameter of less than 500, preferably less than 300 and more preferably less than or equal to 200 nm and greater than 5 nm. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA. Such randomly distributed voids may contain one or more gases, such as argon, nitrogen, krypton, CO2, SO2, or oxygen, or the holes can contain a vacuum with substantially no gas; regardless of the presence or absence of any gas, the refractive index of the hole-containing region is lowered due to the presence of the holes. The holes can be randomly or non-periodically disposed, while in other embodiments the holes are disposed periodically. In some embodiments, the plurality of holes comprises a plurality of non-periodically disposed holes and a plurality of periodically disposed holes. Alternatively, or in addition, as mentioned above the depressed index can also be provided by downdoping the glass in the hole-containing region (such as with fluorine) or undoping (such as with germania) one or both of the surrounding regions.

Region 20 can be made by methods that utilize preform consolidation conditions, which are effective to trap gases in the consolidated glass blank, thereby causing the formation of voids in the consolidated glass optical fiber preform. Rather than taking steps to remove these voids, the resultant preform is used to form an optical fiber with voids, or holes, therein. As used herein the diameter of a hole is the longest line segment whose endpoints are disposed on the silica internal surface defining the hole when the optical fiber is viewed in perpendicular cross-section transverse to the optical fiber central axis. The use and/or formation of microstructured regions in optical fiber is described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; 60/841,490 filed Aug. 31, 2006; and 60/879,164 filed Jan. 8, 2007, all of which are assigned to Corning Incorporated and all of which are incorporated by reference herein.

The optical fiber disclosed herein may or may not include germania or fluorine to also adjust the refractive index of the core and or cladding of the optical fiber, but these dopants can also be avoided in annular region 20 and instead, the holes (in combination with any gas or gases that may be disposed within the holes) can be used to adjust the manner in which light is guided down the core of the fiber. If the annular region 20 comprises randomly distributed voids, this region may consist of undoped (no germanium or fluorine) silica, thereby completely avoiding the use of any dopants in the hole-containing region, to achieve a decreased refractive index, or alternatively the annular region 20 may comprise both randomly distributed voids and doped silica, e.g. fluorine-doped silica having a plurality of holes.

The core region preferably comprises an alkali metal oxide selected from the group consisting of $K_2O$, $Na_2O$, $Li_2O$, $Rb_2O$, $Cs_2O$ and mixtures thereof (most preferably $K_2O$) in an average concentration in said core between about 50 and 1000 ppm by weight. The core also preferably comprises chlorine and fluorine. The core preferably is essentially free of germanium, and more preferably contains no germanium. Preferably, the average concentration of fluorine in said core is greater than the average amount of alkali metal oxide in said core and the average amount of chlorine in said core is greater than the average amount of alkali metal oxide in said core. The fiber also preferably includes a fluorine doped silica-based cladding (e.g. annular regions 18 and 22) which surrounds and in some preferred embodiments is directly adjacent the core. Preferably the second annular region exhibits a refractive index delta which is at least 0.1 delta percent lower and more preferably at least 0.2 delta percent lower than the first annular region, and preferably lower than both the first and third annular regions.

In some preferred embodiments, the core region comprises a first central core region (extending to about 1 micron) located along the centerline of the core which preferably contains a lower average concentration of chlorine than is contained in the outer region (i.e., extending from about 1 to about 4 microns) of the core. In particular, the average concentration of chlorine present in the central core region may be less than 100 ppm, more preferably less than 50 ppm, and the average concentration of chlorine in the second or outer core region which surrounds the first region may be greater than 500 ppm, more preferably greater than 750 ppm, even more preferably greater than 1000 ppm, and most preferably greater than 1500 ppm. The peak concentration of chlorine in the core region is preferably greater than 500 ppm, more preferably greater than 1000 ppm, and most preferably greater than 1500 ppm.

The average concentration of fluorine present in the central core region is preferably greater than 500 ppm, more preferably greater than 750 ppm, and most preferably greater than 1000 ppm, and the average concentration of fluorine in the second or outer core region which surrounds the first region is likewise preferably greater than 500 ppm, more preferably greater than 750 ppm, and most preferably greater than 1000 ppm.

The average concentration of fluorine across the entire core region is preferably greater than 500 ppm, more preferably greater than 750 ppm, and most preferably greater than 1000 ppm, and preferably less that 5000 ppm, more preferably less than 4000 ppm. In the embodiment illustrated, the peak concentration of the chlorine in said second core region is higher than the peak concentration of fluorine in said second region, although this relationship is not critical. Preferably, the average concentrations of both chlorine and fluorine in the core region are greater than about 500 ppm, more preferably greater than about 750 ppm, and most preferably greater than about 1000 ppm.

In some preferred embodiments, the optical fiber disclosed herein comprises a single core segment, namely a central core segment 14, and a cladding 16 surrounding and directly adjacent the central core segment, wherein the cladding has a negative refractive index relative to pure silica, and wherein the core comprises fluorine and an alkali metal oxide selected from the group consisting of $K_2O$, $Na_2O$, $LiO_2O$, $Rb_2O$, $Cs_2O$ and mixtures thereof, with a peak alkali metal oxide concentration of between 20 and 700 ppm, preferably between 50 and 500 ppm, even more preferably between 100 and 400 ppm.

The core region 14A of the fiber comprises a peak relative refractive index delta (relative to the cladding), $\Delta_{MAX}$, between 0.2 and 0.5%, preferably between 0.3 and 0.4%. The optical fiber comprises greater than 90 wt % $SiO2$, preferably greater than or equal to 95 wt % $SiO_2$.

In the embodiment illustrated in FIG. 1, the fiber has a single core segment 14, which is surrounded by cladding segment 16. Preferably, the alkali metal oxide concentration varies as a function of radius. Preferably, the concentration of alkali metal oxide generally decreases as a function of increasing radius from the centerline of the optical fiber along at least a portion of the optical fiber radius. Core segment 14 of the optical fiber may generally have a step shape as shown in FIG. 1, or core segment 14 may have a rounded, alpha or triangular shape.

In one embodiment according to the present invention, the refractive index profile of the optical fiber such as that disclosed in FIG. 1 is tailored to result in a single mode optical fiber which preferably has a zero dispersion wavelength, $\lambda_0$, less than 1420 nm, more preferably less than 1350 nm, more preferably less than 1324 nm, and most preferably between about 1280 nm and 1324 nm, a dispersion slope at 1310 nm, less than about 0.09 $ps/nm^2/km$, a dispersion slope at 1550 nm which is less than about 0.07 $ps/nm^2/km$, more preferably less than about 0.065 $ps/nm^2/km$, and most preferably less than about 0.06 $ps/nm^2/km$, and a total dispersion between about 13 and 19 ps/nm/km at 1550 nm, more preferably between about 14 ps/nm/km and 18 ps/nm/km at 1550 nm. However, other refractive index profiles could be used to achieve these same properties. Preferably, the optical fiber has a cable cutoff wavelength less than about 1300 nm, more preferably less than about 1260 nm. Preferably the optical fiber has an effective area greater than about 70 $\mu m^2$ at 1550 nm, more preferably greater than about 75 $\mu m^2$ at 1550 nm. The optical fiber preferably has a core diameter greater than about 3 $\mu m$, more preferably between about 3 $\mu m$ and 5 $\mu m$, and a mode field diameter greater than about 9.5 $\mu m$, more preferably between about 10 $\mu m$ and 11 $\mu m$ at 1550 nm. By including an alkali metal oxide in accordance with the invention, optical fibers may be made which have an attenuation less than about 0.30 dB/km at 1310 nm and less than about 0.18 dB/km at 1550 nm; more preferably less than about 0.175 dB/km at 1550 nm, and most preferably less than about 0.17 dB/km at 1550 nm. In one preferred embodiment of the invention, illustrated for example by Examples 9-12, the fibers of the present invention exhibit an attenuation of less than 0.18 dB/km at 1550, more preferably less than 0.17 dB/km, and the dispersion/attenuation at 1550 nm is greater than 80 ps/nm/dB, more preferably greater than 90 ps/nm/dB. In some preferred embodiments, the dispersion/attenuation at 1550 nm is between about 80 and 110 ps/nm/dB, even more preferably between 80 and 100 ps/nm/dB. The dispersion of the fibers in these embodiments is preferably less than 18 ps/nm/km, more preferably less than 17 ps/nm/km. The fibers disclosed herein exhibit a 20 mm diameter bend loss less than 1 dB/turn, more preferably less than 0.5 dB/turn, and most preferably less than 0.25 dB/turn.

Examples of such fibers in accordance with the invention are set forth below in Table 1. In each of the examples in Table 1, random voids were employed in second annular cladding region 20, thereby achieving a significant down-doping effect relative to cladding region 18 or 22. Region 20 employed silica glass comprising randomly distributed voids having a mean void diameter of 200 nm. Table 1 provides the maximum refractive index $\Delta_1$ of inner core segment 14B, the average refractive index $\Delta_1$ of core segment 14 (delta average), the radius $R_1$ of core region 14, the refractive index $\Delta_2$ of first annular cladding region 18, the outer radius of first annular cladding region 18, the width of second annular cladding region 20, and the void fill fraction for a variety of examples in accordance with the invention. In all of the examples, no germanium is employed in the core, and the cladding comprises fluorine doped silica in regions 18 and 22, and randomly distributed voids in region 20. Thus, the refractive index deltas of the individual segments are taken with respect to the outer fluorine doped cladding region 22. Also set forth in Table 1 for each example is dispersion at 1310 nm, dispersion slope at 1310 nm, zero dispersion wavelength, dispersion at 1550 nm, dispersion slope at 1550 nm, cable cutoff wavelength, mode field diameter at 1310 nm and 1550 nm, Effective Area at 1310 and 1550 nm, cable cutoff wavelength, and attenuation at 1550 nm.

TABLE 1

|  | Example | | | | | | | |
| --- | --- | --- | --- | --- | --- | --- | --- | --- |
|  | 1 | 2 | 3 | 4 | 5 | 6 | 7 | 8 |
| 14B Max $\Delta_1$, (%) | 0.38 | 0.38 | 0.36 | 0.35 | 0.42 | 0.34 | 0.30 | 0.28 |
| Core 14 Avg $\Delta_1$, (%) | 0.33 | 0.33 | 0.31 | 0.29 | 0.37 | 0.29 | 0.25 | 0.23 |
| Core radius $R_1$ (um) | 3.9 | 3.9 | 4.05 | 3.91 | 3.9 | 3.9 | 3.9 | 3.9 |
| Region 18 $\Delta2$, (%) | 0 | 0.02 | 0 | 0.03 | −0.01 | 0.02 | 0.01 | 0.03 |
| Region 18 $R_2$ (um) | 15.0 | 15.0 | 15.6 | 15.0 | 15.0 | 20.0 | 20.0 | 20.0 |
| Region 20 width (um) | 7.0 | 7.0 | 7.3 | 7.0 | 7.0 | 4.0 | 4.0 | 5.0 |

TABLE 1-continued

| | Example | | | | | | | |
|---|---|---|---|---|---|---|---|---|
| | 1 | 2 | 3 | 4 | 5 | 6 | 7 | 8 |
| Region 20 Void Fill, (%) | 1.5 | 1.5 | 1.4 | 1.5 | 1.5 | 2.2 | 2.2 | 1.7 |
| 1310 nm Dispersion (ps/nm/km) | −0.30 | −0.54 | 0.02 | −0.85 | 0.28 | −1.25 | −1.05 | −2.19 |
| 1310 nm Slope (ps/nm2/km) | 0.084 | 0.084 | 0.085 | 0.087 | 0.083 | 0.085 | 0.089 | 0.088 |
| Zero Dispersion (nm) | 1314 | 1316 | 1310 | 1320 | 1307 | 1325 | 1322 | 1335 |
| 1310 nm MFD (um) | 9.2 | 9.4 | 9.5 | 10.0 | 8.7 | 10.1 | 11.1 | 11.5 |
| 1310 nm Aeff (sq. um) | 64.8 | 67.9 | 69.3 | 75.9 | 59.0 | 76.9 | 91.3 | 97.9 |
| 1550 nm Dispersion (ps/nm/km) | 16.4 | 16.3 | 16.8 | 16.7 | 16.5 | 15.8 | 17.0 | 16.0 |
| 1550 nm Slope (ps/nm2/km) | 0.06 | 0.06 | 0.06 | 0.06 | 0.06 | 0.06 | 0.07 | 0.07 |
| 1550 nm MFD (um) | 10.7 | 11.0 | 11.0 | 11.8 | 10.0 | 12.0 | 13.3 | 14.2 |
| 1550 Aeff (sq. um) | 85.2 | 90.5 | 90.9 | 103.5 | 75.5 | 107.3 | 129.9 | 150.3 |
| Cable Cutoff (nm) | 1170 | 1210 | 1180 | 1225 | 1200 | 1200 | 1225 | 1230 |
| 1550 nm Attn (dB/km) | 0.170 | 0.170 | 0.168 | 0.165 | 0.172 | 0.165 | 0.163 | 0.162 |

Preferably, both the core and the cladding of the optical fiber contain an alkali metal oxide dopant. The alkali metal oxide is preferably an oxide of K, Na, Li, Cs, or Rb, or a mixture thereof; more preferably the alkali metal oxide is $K_2O$, $Rb_2O$, $Cs_2O$ or mixtures thereof; and most preferably the alkali metal oxide is $K_2O$. Preferably, the alkali metal oxide has a peak concentration in the core of the optical fiber. The alkali metal oxide concentration may vary radially across the radius of the optical fiber, and in some cases may decrease as a function of increasing radius from the centerline of the optical fiber along at least a portion of the optical fiber radius.

As can be seen in the table above, in one set of preferred embodiments, the inner radius of annular region 20 is between about 12 and 18 microns, and in particular is spaced about 8 to 14, more preferably 9 to 12 microns from the core. This set of embodiments results in an effective area at 1550 which is greater than 75 µm², more preferably greater than 90 µm², and most preferably greater than 95 µm². These examples also employ a region 20 having a width between about 5 and 10, more preferably between about 6 and 9 microns. In a second preferred set of embodiments, the annular ring region 20 is spaced a distance of at least 10, and more preferably 12, and most preferably 15 microns from the core. The annular ring region in this embodiment comprises a width of preferably between about 2 and 8 microns, more preferably between about 3 and 6 microns. This second set of preferred embodiments exhibit an even higher effective area at 1550, namely, higher than 80 µm², more preferably higher than 100 µm², and in most cases higher than 120 µm². All of the fibers disclosed herein exhibit a 20 mm diameter bend loss less than 1 dB/turn, more preferably less than 0.5 dB/turn, and most preferably less than 0.25 dB/turn.

Additional Examples of fibers in accordance with the invention are set forth below in Table 2. In each of the examples in Table 2, fluorine doping was employed in second annular cladding region 20 and no voids were employed in this region, thereby achieving a significant down-doping effect relative to cladding region 18 or 22. Table 2 provides the maximum refractive index $\Delta_1$ of inner core segment 14B, the average refractive index $\Delta_1$ of core segment 14 (delta average), the radius $R_1$ of core region 14, the refractive index $\Delta_2$ of first annular cladding region 18, the outer radius of first annular cladding region 18, the width of second annular cladding region 20, the outer radius $R_3$ of second annular cladding region 20, and the refractive index $\Delta_3$ of second annular cladding region 20. In all of the examples, no germanium is employed in the core, and the cladding comprises fluorine doped silica in regions 18, 20 and 22, and no randomly distributed voids. Thus, the refractive index deltas of the individual segments are taken with respect to the outer fluorine doped cladding region 22. Also set forth in Table 2 for each example is dispersion at 1310 nm, dispersion slope at 1310 nm, zero dispersion wavelength, dispersion at 1550 nm, dispersion slope at 1550 nm, cable cutoff wavelength, mode field diameter at 1310 nm and 1550 nm, Effective Area at 1310 and 1550 nm, cable cutoff wavelength, and attenuation at 1550 nm.

TABLE 2

| | Example | | | | | | |
|---|---|---|---|---|---|---|---|
| | 9 | 10 | 11 | 12 | 13 | 14 | 15 |
| 14B Max $\Delta_{1,}$ (%) | 0.38 | 0.38 | 0.36 | 0.35 | 0.42 | 0.34 | 0.30 |
| Core 14 Avg $\Delta_{1,}$ (%) | 0.329 | 0.329 | 0.309 | 0.294 | 0.365 | 0.289 | 0.249 |
| Core radius $R_1$ (um) | 3.9 | 3.9 | 4.05 | 3.91 | 3.9 | 3.9 | 3.9 |
| Region 18 $\Delta_{2,}$ (%) | 0 | 0.02 | 0 | 0.025 | −0.01 | 0.02 | 0.01 |
| Rad2 (um) | 15 | 15 | 15.6 | 15 | 14.98 | 20 | 20 |
| Region 20 width (um) | 7 | 7 | 7.3 | 7 | 7 | 4 | 4 |
| Radius3 (um) | 22 | 22 | 22.9 | 22 | 21.98 | 24 | 24 |
| Region 20 $\Delta_{3,}$ (%) | −0.22 | −0.12 | −0.24 | −0.26 | −0.18 | −0.26 | −0.30 |
| Region 20 Vol (%-$um^2$) | −57.0 | −31.1 | −67.5 | −66.0 | −47.6 | −45.8 | −52.8 |
| 1310 Dispersion (ps/nm/km) | −0.30 | −0.54 | 0.02 | −0.85 | 0.28 | −1.25 | −1.05 |
| 1310 Slope (ps/$nm^2$/km) | 0.084 | 0.084 | 0.085 | 0.087 | 0.083 | 0.085 | 0.089 |
| Zero Dispersion (nm) | 1314 | 1316 | 1310 | 1320 | 1307 | 1325 | 1322 |
| 1310 MFD (um) | 9.2 | 9.4 | 9.5 | 10.0 | 8.7 | 10.1 | 11.1 |
| 1310 Aeff (sq. um) | 64.8 | 67.9 | 69.3 | 75.9 | 59.0 | 76.9 | 91.3 |
| 1550 Dispersion (ps/nm/km) | 16.4 | 16.3 | 16.8 | 16.7 | 16.5 | 15.8 | 17.0 |
| 1550 Slope (ps/$nm^2$/km) | 0.06 | 0.06 | 0.06 | 0.06 | 0.06 | 0.06 | 0.07 |
| 1550 MFD (um) | 10.7 | 11.0 | 11.0 | 11.8 | 10.0 | 12.0 | 13.3 |
| 1550 Aeff (sq. um) | 85.2 | 90.5 | 90.9 | 103.5 | 75.5 | 107.3 | 129.9 |
| Cable Cutoff (nm) | 1170 | 1210 | 1180 | 1225 | 1200 | 1200 | 1225 |
| 1550 Attn (dB/km) | 0.170 | 0.170 | 0.168 | 0.165 | 0.172 | 0.165 | 0.163 |

| | Example | | | | |
|---|---|---|---|---|---|
| | 16 | 17 | 18 | 19 | 20 |
| 14B Max $\Delta_{1,}$ (%) | 0.28 | 0.24 | 0.39 | 0.35 | 0.24 |
| Core 14 Avg $\Delta_{1,}$ (%) | 0.23 | 0.189 | 0.334 | 0.294 | 0.189 |
| Core radius $R_1$ (um) | 3.9 | 3.9 | 3.9 | 3.91 | 3.9 |
| Region 18 $\Delta_{2,}$ (%) | 0.03 | 0.03 | 0.005 | 0.025 | 0.03 |
| Rad2 (um) | 20 | 20 | 15 | 15 | 20 |
| Region 20 width (um) | 5 | 5 | 3 | 3 | 3 |
| Radius3 (um) | 25 | 25 | 18 | 18 | 23 |
| Region 20 $\Delta_{3,}$ (%) | −0.37 | −0.36 | −0.32 | −0.26 | −0.46 |
| Region 20 Vol (%-$um^2$) | −83.3 | −81.0 | −31.2 | −25.2 | −59.3 |
| 1310 Dispersion (ps/nm/km) | −2.19 | −1.90 | −0.29 | −0.86 | −1.87 |
| 1310 Slope (ps/$nm^2$/km) | 0.088 | 0.094 | 0.084 | 0.087 | 0.094 |
| Zero Dispersion (nm) | 1335 | 1330 | 1313 | 1320 | 1330 |

TABLE 2-continued

| | | | | | |
|---|---|---|---|---|---|
| 1310 MFD (um) | 11.5 | 13.2 | 9.2 | 10.0 | 13.2 |
| 1310 Aeff (sq. um) | 97.9 | 129.1 | 64.8 | 75.9 | 129.0 |
| 1550 Dispersion (ps/nm/km) | 16.0 | 17.6 | 16.5 | 16.6 | 17.7 |
| 1550 Slope (ps/nm²/km) | 0.07 | 0.07 | 0.06 | 0.06 | 0.07 |
| 1550 MFD (um) | 14.2 | 16.7 | 10.7 | 11.8 | 16.6 |
| 1550 Aeff (sq. um) | 150.3 | 208.1 | 85.1 | 103.6 | 207.3 |
| Cable Cutoff (nm) | 1230 | 1200 | 1180 | 1226 | 1210 |
| 1550 Attn (dB/km) | 0.162 | 0.160 | 0.170 | 0.165 | 0.160 |

As can be seen in Table 2 above, in some embodiments, the inner radius of annular region 20 is between about 12 and 18 microns, and in particular is spaced about 8 to 14, more preferably 9 to 12 microns from the core. These embodiments had an effective area at 1550 which is greater than 75 μm², more preferably greater than 90 μm², and most preferably greater than 95 μm². These examples also employ a region 20 having a width between about 5 and 10, more preferably between about 6 and 9 microns. In a second preferred set of embodiments, the annular ring region 20 is spaced a distance of at least 10, and more preferably 12, and most preferably 15 microns from the core. The annular ring region in this embodiment comprises a width of preferably between about 2 and 8 microns, more preferably between about 3 and 6 microns. This second set of preferred embodiments exhibit an even higher effective area at 1550, namely, higher than 80 μm², more preferably higher than 100 μm², and in most cases higher than 120 μm². All of the fibers disclosed herein exhibit a 20 mm diameter bend loss less than 1 dB/turn, more preferably less than 0.5 dB/turn, and most preferably less than 0.25 dB/turn. The optical fibers disclosed in Table 2 employed a refractive index delta which was less than −0.1 percent, more preferably less than −0.15 percent, and most preferably less than −0.2 percent. The fibers also employed a second annular cladding region whose absolute value of profile volume, $|V_3|$, is greater than 20%-μm², more preferably greater than 30%-μm², and in some embodiments greater than 40%-μm².

Additional Examples 21-29 of fibers in accordance with the present invention are set forth below in Table 3. In each of the examples in Table 3, fluorine doping was employed in first annular cladding region 18 and outer cladding region 22, and either fluorine and/or randomly distributed voids were employed in second annular cladding region 20, thereby achieving a significant down-doping effect in region 20 relative to cladding region 18 or 22. Table 3 provides the average refractive index $\Delta_1$ of core segment 14 (delta average), the radius $R_1$ of core region 14, the refractive index $\Delta_2$ of first annular cladding region 18 and refractive index $\Delta_4$ of outer cladding region 22 (which for the examples in Table 3 were substantially equal), the alpha of the core segment 14 (in preferred embodiments of the invention, alpha is greater than 1, more preferably greater than 4) the outer radius $R_2$ of first annular cladding region 18, the outer radius $R_3$ of second annular region 20, the profile volume $V_3$ of second annular region 20, and the core/clad ration ($R_1/R_2$). In all of the examples, no germanium and no alkali metal oxides were employed in the core. The refractive index deltas of the individual segments are taken with respect to the outer fluorine doped cladding region 22. The examples 21-25 comprise fluorine with no voids in region 20. Also set forth in Table 3 for each example is mode field diameter at 1310 nm and 1550 nm, effective area at 1550 nm, dispersion at 1310 nm, dispersion slope at 1310 nm, zero dispersion wavelength, dispersion at 1550 nm, dispersion slope at 1550 nm, attenuation at 1550 nm, cable cutoff wavelength, LP11 cutoff wavelength, 10 mm bend loss, 15 mm bend loss, and 20 mm bend loss.

TABLE 3

| | Example | | | | | | | | |
|---|---|---|---|---|---|---|---|---|---|
| | 21 | 22 | 23 | 24 | 25 | 26 | 27 | 28 | 29 |
| Core 14 Avg Δ1, (%) | 0.38 | 0.31 | 0.31 | 0.36 | 0.38 | 0.27 | 0.3 | 0.38 | 0.39 |
| D2 = D4 (%) | 0 | 0 | 0 | 0 | 0 | 0 | 0 | 0 | 0 |
| R1 (um) | 4.4 | 5.7 | 5.8 | 4.5 | 4.4 | 6.2 | 5.6 | 4.4 | 4.5 |
| Alpha | 8.74 | 9.2 | 8.36 | 8.4 | 8.24 | 9.31 | 8.53 | 8.82 | 8.43 |
| D2 (%) | −0.34 | −0.44 | −0.2 | −0.19 | −0.21 | −1.2 | −1.2 | −1.2 | −1.2 |
| R2 (um) | 15.0 | 18.1 | 18.3 | 14.4 | 14.5 | 19.0 | 17.5 | 16.1 | 14.7 |
| R3 (um) | 19.4 | 22.0 | 25.6 | 19.0 | 22.1 | 21.7 | 20.5 | 18.4 | 16.9 |
| Region 20 Volume (%-sq. um) | −52.0 | −68.8 | −63.1 | −32.3 | −59.4 | −128.5 | −140.1 | −93.5 | −81.2 |
| R1/R2 | 0.297 | 0.313 | 0.318 | 0.31 | 0.306 | 0.323 | 0.319 | 0.269 | 0.302 |

TABLE 3-continued

| | Example | | | | | | | | |
|---|---|---|---|---|---|---|---|---|---|
| | 21 | 22 | 23 | 24 | 25 | 26 | 27 | 28 | 29 |
| 1310 MFD (um) | 8.74 | 10.22 | 10.27 | 8.9 | 8.68 | 10.98 | 10.19 | 8.67 | 8.63 |
| 1550 MFD (um) | 9.94 | 11.38 | 11.40 | 10.17 | 9.88 | 12.19 | 11.40 | 9.90 | 9.79 |
| 1550 Aeff (sq. um) | 75.2 | 101.0 | 101.5 | 78.4 | 74.2 | 116.2 | 100.6 | 74.4 | 73.1 |
| 1310 Dispersion (ps/nm/km) | −0.42 | 1.87 | 2.02 | −0.57 | −0.55 | 2.22 | 1.58 | −0.76 | −0.31 |
| 1310 Slope (ps/nm2/km) | 0.086 | 0.089 | 0.089 | 0.086 | 0.086 | 0.090 | 0.089 | 0.085 | 0.086 |
| Zero Dispersion (nm) | 1315 | 1289 | 1287 | 1317 | 1316 | 1285 | 1292 | 1319 | 1314 |
| 1550 Dispersion (ps/nm/km) | 16.3 | 19.2 | 19.4 | 16.2 | 16.2 | 19.8 | 18.9 | 15.9 | 16.5 |
| 1550 Slope (ps/nm2/km) | 0.059 | 0.060 | 0.060 | 0.059 | 0.058 | 0.061 | 0.061 | 0.059 | 0.059 |
| 1550 Attn (dB/km) | 0.173 | 0.169 | 0.168 | 0.172 | 0.173 | 0.167 | 0.169 | 0.173 | 0.173 |
| Cable Cutoff (nm) | 1230 | 1395 | 1420 | 1189 | 1254 | 1446 | 1375 | 1226 | 1259 |
| LP11 Cutoff (nm) | 1270 | 1462 | 1500 | 1267 | 1260 | 1486 | 1405 | 1247 | 1286 |
| 10 mm bend loss (dB/turn) | 0.31 | 0.53 | 0.42 | 0.76 | 0.24 | 0.95 | 0.30 | 0.30 | 0.23 |
| 15 mm bend loss (dB/turn) | 0.12 | 0.21 | 0.16 | 0.30 | 0.09 | 0.37 | 0.12 | 0.11 | 0.09 |
| 20 mm bend loss (dB/turn) | 0.002 | 0.003 | 0.002 | 0.004 | 0.001 | 0.005 | 0.002 | 0.002 | 0.001 |

As can be seen in Table 3 above, in some embodiments, annular region 20 is spaced about 8 to 14, more preferably 9 to 13, and in some embodiments 9 to 12 microns from the core. These embodiments had an effective area at 1550 which is greater than about 70 $\mu m^2$, more preferably greater than 90 $\mu m^2$, and in some embodiments greater than 95 $\mu m^2$. These examples also employ a region 20 having a width between about 4 and 10, more preferably between about 6 and 9 microns. All of the fibers disclosed herein exhibit a 20 mm diameter bend loss less than 1 dB/turn, more preferably less than 0.5 dB/turn, and most preferably less than 0.25 dB/turn. The optical fibers disclosed in Table 3 comprise a second annular region 20 which employed an effective refractive index delta (the region employed silica glass comprising randomly distributed voids having a mean void diameter of 200 nm therein) less than 1 percent, wherein region 20 in Examples 26-29 is −1.20 percent effective refractive index delta. The fibers also employed a second annular cladding region whose absolute value of profile volume, $|V_3|$, is greater than 20%-$\mu m^2$, more preferably greater than 30%-$\mu m^2$, and in some embodiments greater than 40%-$\mu m^2$, and in some embodiments greater than 60, 80, or even 100%-$\mu m^2$.

The diffusion of an alkali metal oxide may be advantageously controlled during the draw process. It has been found that by varying draw conditions in a prescribed manner, alkali metal oxide dopants may be distributed throughout the preform in a desired concentration profile. Preferably, the alkali metal oxide dopant is diffused in a relatively linear relationship with respect to radius. Because the diffusion of an alkali metal oxide dopant is partially dependent upon the temperature of the glass being doped, and the time the glass remains at the temperature, these same factors play a significant role in controlling the alkali metal oxide diffusion during the draw process. The time and the temperature to which an optical fiber preform (and the optical fiber drawn from the preform) are exposed during the draw process are controlled by varying the draw speed, the draw (furnace) temperature and optical fiber tension. For example, increasing the draw speed decreases the dwell time for a particular section of the optical fiber preform in the draw furnace, thus decreasing the distance which an alkali metal oxide dopant will diffuse across the optical fiber preform, and hence the drawn optical fiber. This may result in less alkali metal oxide diffusing into the cladding and, therefore, a higher alkali metal oxide concentration in the core of the optical fiber. Conversely, decreasing the draw speed increases the dwell time, and, therefore, may result in an decrease in the concentration of alkali metal oxide in the core of the optical fiber as the alkali metal oxide diffuses further into the cladding of the optical fiber. In a like manner increasing the furnace temperature may increase the diffusion rate of the alkali metal oxide, decreasing the concentration of alkali metal oxide. Consequently, draw speed and furnace temperature may be effectively used to control the diffusion, and thus the distribution of alkali metal oxide within the resulting optical fiber.

Figure 2:
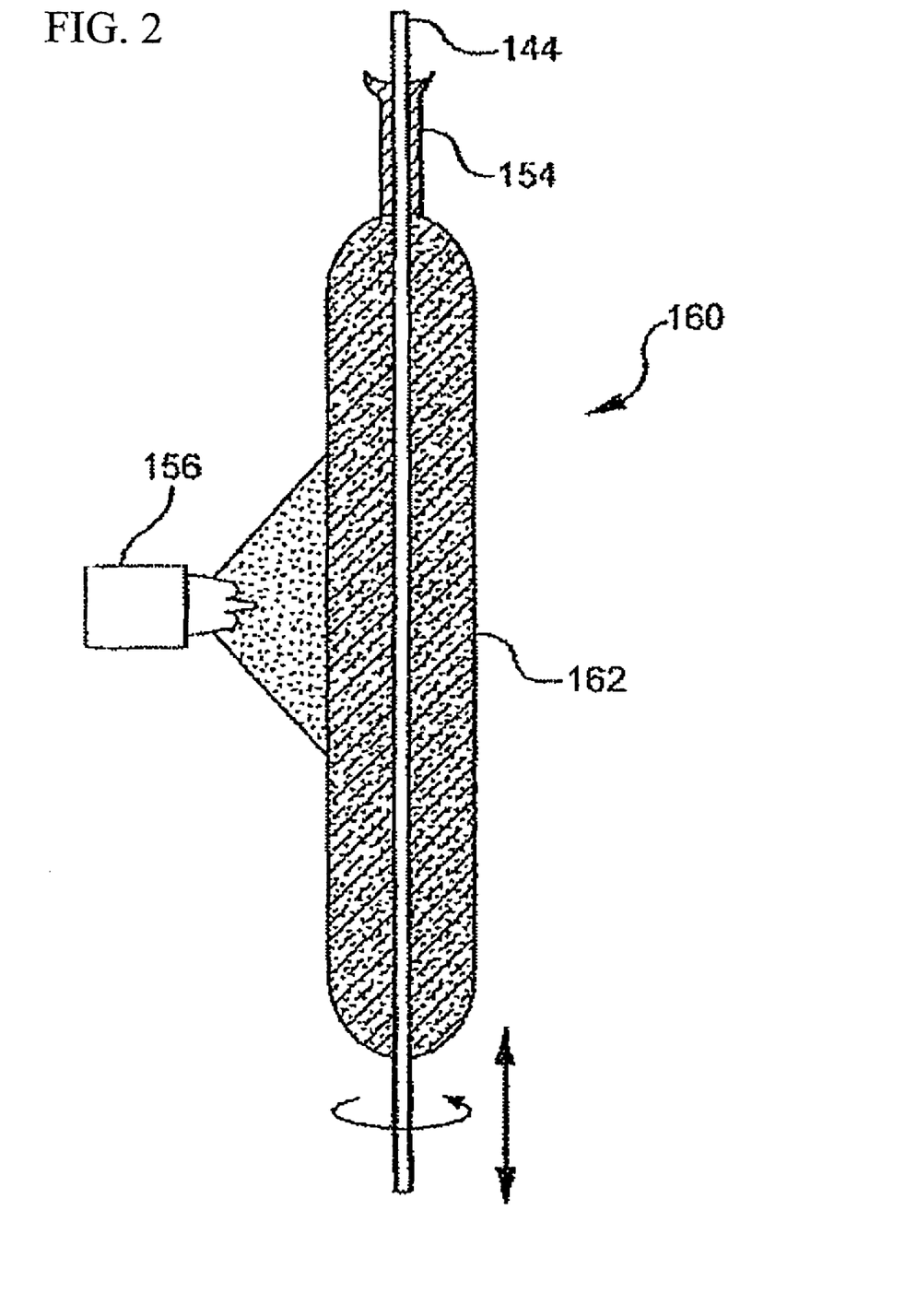
FIG. 2 shows a method of depositing glass soot.

Referring to FIG. 2 which is an illustration of a conventional outside vapor deposition process, a soot burner 156 is used to deposit multiple layers of silica soot 162 onto a mandrel 144 to form soot preform 160. The resultant soot preform is then dried using standard chlorine drying techniques. The soot is then doped with fluorine by exposing the soot to an atmosphere of a fluorine containing compound (e.g.

SiF$_4$) for a time and at a temperature sufficient to result in removal of much or all of the chlorine remaining from the drying step. The exposure to a fluorine-containing atmosphere (fluorine sweep) is done at temperatures preferably less than about 1100° C. to avoid doping the glass with high levels of fluorine. Low levels of fluorine doping are desirable, i.e., 0.1 to 0.4 wt. % fluorine, for example. The resultant fluorine (and potentially chlorine) doped soot tube is then consolidated.

The consolidated glass tube is then alkali doped. For example, referring to FIG. 3, the resultant glass tube 106 is preferably first mounted between chucks in a lathe 101 (such as a glass-working lathe or a conventional modified chemical vapor deposition (MCVD) glass-forming lathe). A preferably annular reservoir 108 for receiving an alkali metal source compound 110 is formed near one end of tube 106 by forging two annular neck-like deformations 112 in the wall of tube 106 by flame working or otherwise welding the reservoir to the tube. Other types of reservoir may be also used. Preferably, the annular neck-like deformations 112 are about 2 cm from each other. Preferably, to prevent crystallization of the alkali metal, it is desirable that tube 106, and any additional glass deposited on the inside of tube 106, be essentially chlorine free. By essentially chlorine free we mean exhibiting a chlorine content sufficiently low that optical losses due to alkali chloride crystallization are avoided. A chlorine content preferably less than about 500 ppm by weight is desired for this purpose; more preferably less than about 100 ppm by wt.; and most preferably less than about 50 ppm by wt. In addition, silica glass tube 106, and any additional glass deposited therein, should be essentially free of "water". By "water" we mean the hydroxyl group OH. Water is responsible for an absorption peak at or about 1383 nm and which absorption peak may extend into the operating wavelength regions of an optical fiber. This peak may have a detrimental effect on the fiber attenuation. Therefore, it is desirable to reduce the absorption peak, also referred to as the water peak, by reducing the OH content of the glass as much as possible. Preferably, glass tube 106 contains less than about 100 ppb by wt. OH; and more preferably less than about 20 ppb by wt. To ensure that starting glass articles are essentially free from water prior to diffusing an alkali metal oxide dopant, conventional chlorine drying techniques may be employed during manufacture of the silica glass tube.

Referring again to FIG. 3, alkali source compound 110 is introduced into tube 106 at reservoir 108 and heated by heat source 114 to form a vapor as tube 106 is rotated. Oxygen or a carrier gas is flowed into the inlet 116 of tube 106 through rotating seal 118, and portion 120 of tube 106 downstream of the alkali metal oxide source compound 110 is heated to facilitate diffusion of the alkali metal oxide into interior surface 122 of tube 106. Preferably, the tube 106 does not have any preform components inserted therein, such as another glass rod or the like. The portion 120 of tube 106 downstream of the alkali metal oxide source compound 110 should be heated to a temperature sufficient to promote rapid diffusion of the alkali into surface 122 and to prevent devitrification of the glass. Preferably, portion 120 of tube 106 downstream of alkali metal oxide source compound 110 is heated by heat source 124 to above 1500° C.; more preferably between about 1500° C. and 2000° C. Preferably, heat source 124 is traversed along the length of portion 120 of tube 106. Alkali metal oxide source compound 112 preferably comprises an element selected from the group consisting of K, Na, Li, Cs, and Rb. Preferably, alkali metal oxide source compound 110 is a bromide, iodide or fluoride. Most preferably, the alkali metal oxide source compound 110 is KBr, KI or KNO$_3$. The alkali metal oxide (e.g., $K_2O$, $Na_2O$, $Li_2O$, $Rb_2O$, $Cs_2O$ and mixtures thereof) is preferably diffused throughout a depth of between about 100 microns and 500 microns from the inside diffusion surface 122 of tube 106 prior to collapse of tube 106 thereby forming an alkali oxide doped glass tube. In particular, it is preferred that the diffused alkali metal oxide dopant concentration (in wt. %) in the tube varies radially. Preferably, the glass article (e.g. tube 106) is doped such that the concentration is highest on an inner half portion 107 and lower in an outer half portion 109, as shown in the enlarged view of FIG. 3. The demarcation point between the inner and outer half portions is defined by and located at half the radial thickness (illustrated by dotted line 111) of the tube 106. For example, the diffusion is preferably such that the peak concentration of alkali dopant in the outer half portion 109 is less than 50% of the peak concentration (in wt. %) of the inner half portion 107.

Figure 3:
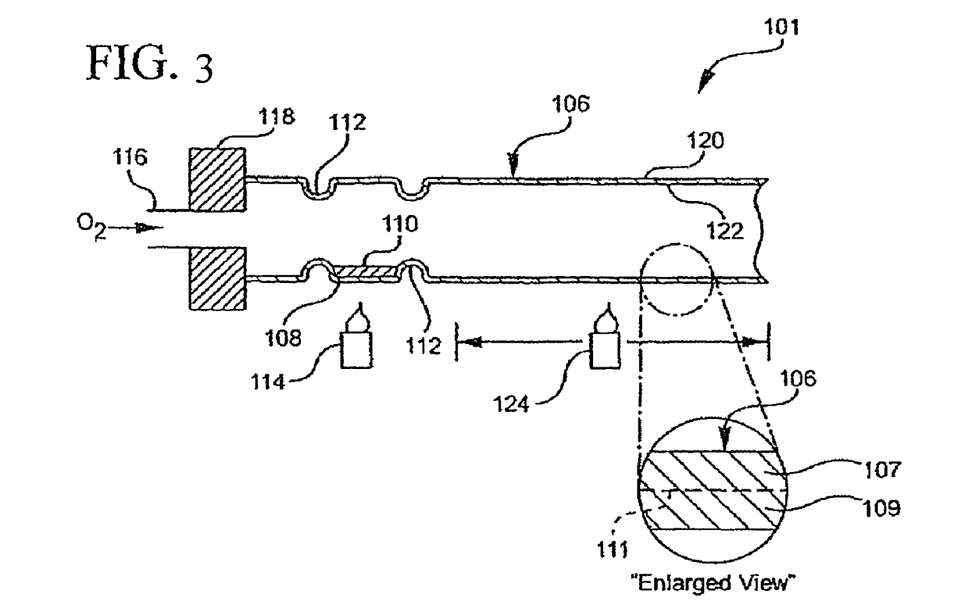
FIG. 3 depicts a method for doping a glass tube with an alkali metal oxide.

The diffusion process may be followed by the step of further heating tube 106 to promote a partial collapse of tube 106 by conventional methods as are known in the art (or by the dry methods described herein) to both reduce the inside surface area through which the alkali metal oxide might be lost and to thicken the layer of glass into which the alkali metal oxide has been diffused. Silica glass tube 106 is then heated with a heat source 124 to collapse tube 106 downstream of alkali metal oxide source compound 110 and form an alkali metal oxide-doped solid glass rod 132. Collapse of tube 106 is accomplished according to conventional methods known in the art, such as heating with a suitable heat source (e.g., a torch). The solid alkali-doped glass rod 132 is then cut from that portion of glass containing alkali metal source compound reservoir 108.

It should be recognized that the alkali-doped rod 132 when collapsed preferably comprises (similar to the tube 106) concentrations of alkali metal oxide that vary radially and which are such that the portion corresponding to the inner half portion 107 has the highest peak concentration (in wt. %) of alkali dopant and the portion corresponding to the outer half portion 109 has a lower peak concentration. Most preferably, the peak concentration of alkali dopant is at the center of the rod and the concentration at half the radius is less than 50% of the peak concentration; and more preferably less than 25%.

Doped glass rod 132 may be heated in a redraw furnace 136 and drawn into a smaller diameter glass rod 144. This redraw process is illustrated in FIG. 5. A glass handle 130 is attached to the alkali-doped glass rod 132 resulting from the collapse stage described supra and the alkali-doped glass rod 132 is mounted in a moving downfeed support 134 above a conventional redraw furnace 136. A sacrificial glass rod 138, which may be attached to the bottom of alkali-doped glass rod 132, is pulled by motor-driven tractors 140, thereby causing the alkali-doped glass rod 132 to be drawn at a suitable rate. A rate of 15 to 23 cm/min has been found to be adequate, the rate being largely controlled in response to the diameter measured by sensor 142. The outer diameter dimension (d1) of the small diameter glass rod 144 resulting from the drawing process is preferably in the range of 3 mm to 10 mm; more preferably less than 6 mm in diameter dimension. The small diameter glass rod 144 should have a peak concentration of $K_2O$ between about 5 times and 10 times the peak $K_2O$ concentration desired in the core of the optical fiber when the optical fiber is drawn, to offset the significant migration of the alkali dopant during draw of the fiber. For example, if the peak $K_2O$ concentration in the optical fiber core is desired to be 0.4 wt. %, the small diameter glass rod 144 preferably should have a peak $K_2O$ concentration between about 2 wt. % and 4 wt. %. In particular, having a very small diameter of the alkali-doped rod is advantageous because this concentrates the transition metal impurities present in the rod very near the fiber's centerline where their negative impact is minimized. It should be recognized that for large amounts of material added to the doped clad, the peak concentration in the fiber could be 100 times less than the peak concentration in the small diameter glass rod. Once formed, small diameter glass rod 144 is further overclad.

Figure 4:
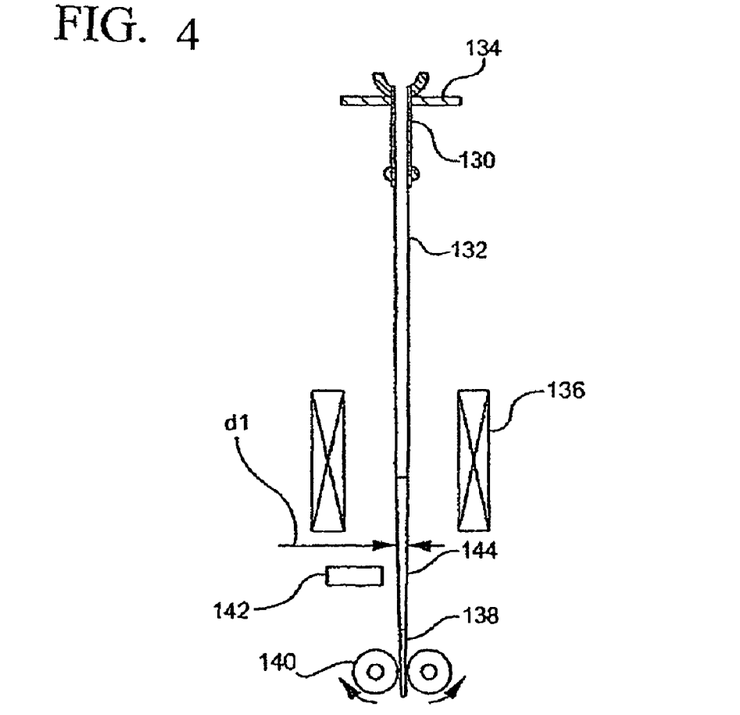
FIG. 4 illustrates a process for drawing a glass rod.

For example, the small diameter alkali-doped glass rod 144 shown in FIG. 4 may be used as a starting rod upon which additional porous glass soot 162 is deposited as overclad using the OVD method illustrated in FIG. 1, to form a optical fiber preform. A glass handle may be attached to alkali-doped glass rod 144 prior to additional soot deposition, the handle becoming an integral part of the resulting preform. The handle provides a method of supporting the silica glass preform resulting from the deposition process during later processing steps. The glass rod 144 having the attached handle may be mounted in a lathe where it is rotated and translated with respect to burner. A composite soot preform is then formed by traversing glass rod 144 many times with respect to burner 156 to cause a build-up of many layers of silica soot-containing to form an outer soot coating. The translating motion could also be achieved by moving burner 156 back and forth along rotating glass rod 144 or by the combined translational motion of both burner 156 and glass rod 144. The outer soot coating forms at least a portion of the core glass of the composite preform 160 which is preferably comprised of substantially pure silica. Preferably, the soot coating has a density greater than 0.35 g/cc, more preferably between about 0.35 g/cc and 0.5 g/cc. The composite preform 160 is then dried by exposing it to a chlorine-containing gas while being heated in a furnace to a temperature of about 1000° C. The preform 160 is then fluorine doped. During the fluorine doping step, the preform 160 is preferably fluorine doped by exposing the preform to a fluorine-containing gas at temperatures (e.g. about 1000° C.) suitable for causing the soot to become doped with the fluorine. In this way, the outer core region of the optical fiber is formed. However the fluorine doping step is only carried out long enough to allow a relatively small amount of fluorine (0.1 to 0.4 wt %), for example. The preform is then consolidated by heating the preform 160 to a suitable temperature for consolidating the preform. The resultant clear glass core preform may then be redrawn to form a second core rod, i.e. a glass rod which contains at least a portion of the core of an optical fiber drawn therefrom. The second core rod may then further be processed by adding additional glass, either by sleeving with a glass tube (either a glass tube or soot tube), through depositing glass soot by chemical vapor deposition, for example, by both sleeving and chemical deposition, or through other methods as are known in the art, to form a complete optical fiber preform ready to be drawn into an optical fiber. The additional glass may comprise core glass, cladding glass or both core and cladding glass. Further, the additional glass may take several additional deposition steps to achieve the desired thickness, wherein after each step, the soot is dried, fluorine doped, consolidated and redrawn into a smaller diameter rod. The annular cladding regions 18, which is preferably the cladding adjacent the core, as well as the annular cladding region 22, are silica preferably sufficiently down doped with fluorine by flood doping (see U.S. Pat. No. 4,629,485) to form the downdoped cladding region of the optical fiber. The doping may preferably be sufficient to achieve a relative refractive index delta % between the core and the cladding of, for example, greater than 0.2%, and more preferably between 0.30% and 0.40%. In particular, for each additional step wherein moat silica (that additional glass corresponding with the cladding of the fiber) is added by deposition to the second rod, such moat silica is doped with fluorine. The moat soot is first dried by subjecting it to a chlorine-containing gas, and then exposed it to a fluorine-containing gas (e.g., $SiF_4$ or $CF_4$) for 60-120 minutes at 1225° C. and then consolidated by downdriving through the hot zone (of 1450-1500° C.) at 7-10 mm/min preferably in the presence of the fluorine-containing gas. This preform may be redrawn to form a third rod and the steps repeated again, i.e., deposition, drying, fluorine doping, and consolidation until the proper diameter final preform is achieved. Region 20 may be formed using fluorine doping techniques as well, or alternatively and preferably region 20 is formed using consolidation techniques (as described above) which result in randomly distributed voids being formed in region 20 which act as a strong downdopant in region 20. After the complete optical fiber preform is manufactured, the completed optical fiber draw preform may be drawn into an alkali metal oxide doped optical fiber.

In all of the embodiments disclosed herein, the optical fiber preferably comprises a primary coating surrounding and in direct contact with the outermost diameter of the cladding, and a secondary coating surrounding and in direct contact with the primary coating.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   a silica-based core, said core comprising an alkali metal oxide selected from the group consisting of $K_2O$, $Na_2O$, $Li_2O$, $Rb_2O$, $Cs_2O$ and mixtures thereof in an average concentration in said core between about 10 and 10000 ppm by weight wherein said core further comprises fluorine in an average amount greater than about 500 ppm by weight, and
   a silica-based cladding surrounding the core, said silica based cladding including at least one annular region having a lower refractive index delta than an outer cladding region of said cladding, said annular region comprises randomly distributed voids, fluorine, or mixtures thereof, and said annular region is spaced from said core, and comprises a relative refractive index $\Delta_{3min} < -0.1\%$ compared to the outer cladding region.

2. The optical fiber of claim 1, wherein said concentration of alkali metal oxide in said core is between about 50 and 1000 ppm.

3. The optical fiber of claim 1, wherein said annular region is spaced from said core a distance of at least 5 microns.

4. The optical fiber of claim 1, wherein said alkali metal oxide is $K_2O$.

5. The optical fiber of claim 1, wherein said core consists essentially of no germanium.

6. The optical fiber of claim 1,
   wherein said fiber exhibits a 20 mm macrobend induced loss of less than 1 dB/turn at 1550 nm,
   wherein said fiber exhibits a cable cutoff less than 1260 nm, zero dispersion wavelength less than 1350 nm, dispersion slope less than 0.09 ps/nm$^2$/km at 1310 nm, attenuation at 1550 nm less than 0.18 dB/km, and an effective area greater than 70 µm$^2$ at 1550 nm.

7. The optical fiber of claim 6, wherein said fiber exhibits a 20 mm macrobend induced loss of less than 0.5 dB/turn at 1550 nm.

8. The optical fiber of claim 6, wherein said fiber exhibits a zero dispersion wavelength less than 1324 nm.

9. The optical fiber of claim 6, wherein said fiber exhibits a dispersion slope less than 0.07 ps/nm$^2$/km at 1550 nm.

10. The optical fiber of claim 6, wherein said fiber exhibits an effective area greater than 90 μm$^2$ and attenuation less than 0.17 dB/km at 1550 nm.

11. The optical fiber of claim 1, wherein the core has a refractive index profile with a peak relative refractive index, $\Delta_{MAX}$, greater than 0.2%, relative to the outer cladding.

12. The optical fiber of claim 6, wherein said annular region is spaced from said core a distance of at least 5 microns.

13. The optical fiber of claim 10, wherein said annular region is spaced from said core a distance of at least 10 microns.

14. The optical fiber of claim 1, wherein said cladding comprises a first annular region comprising fluorine doped silica and a second annular region surrounding said first annular region, said second annular region comprising randomly distributed voids.

15. The optical fiber of claim 14, wherein said first annular region comprises of fluorine doped silica in an amount greater than 500 ppm and said second annular region surrounding said first annular region, said second annular region comprising randomly distributed voids.

16. The optical fiber of claim 1, wherein said annular region further comprises fluorine in an amount greater than 3 wt percent.

17. The optical fiber of claim 14, wherein said cladding comprises a third annular region comprising fluorine doped silica and a third annular region surrounds said second annular region.

18. An optical fiber comprising a silica-based core, wherein said core comprises substantially no germania therein, a radius between 2 and 8 microns, and an alkali metal oxide selected from the group consisting of $K_2O$, $Na_2O$, $Li_2O$, $Rb_2O$, $Cs_2O$ and mixtures thereof in an average concentration in said core between about 10 and 10000 ppm by weight, and a first silica-based cladding region surrounding and adjacent the core, said first silica based cladding comprising an lower refractive index delta than said core, a second silica-based cladding region surrounding said first silica based cladding region, said second silica-based cladding region having a lower refractive index delta than the said first silica-based cladding region, said second silica-based cladding region is spaced from said core a distance of at least 10 microns, and an outer cladding region surrounding said second cladding region, said outer cladding region comprising refractive index delta $\Delta_4$ which is higher than the index delta of the second cladding region, and said fiber further comprises a cable cutoff less than 1260 nm, a zero dispersion wavelength less than 1350, an effective area greater than 90 μm$^2$.

19. The optical fiber of claim 1, wherein said fiber exhibits an effective area greater than 90 μm$^2$ and attenuation less than 0.17 dB/km at 1550 nm and said core further comprises fluorine in an amount greater than about 500 ppm by weight.

20. The fiber of claim 18, wherein said core comprises a radius between 3 and 6 microns.

* * * * *